United States Patent [19]
Sugiyama

[11] Patent Number: 5,619,273
[45] Date of Patent: Apr. 8, 1997

[54] SCANNING LINE INTERPOLATING APPARATUS AND MOTION VECTOR DETECTING APPARATUS FOR SCANNING LINE INTERPOLATION

[75] Inventor: Kenji Sugiyama, Yokosuka, Japan

[73] Assignee: Victor Company of Japan, Ltd., Yokohama, Japan

[21] Appl. No.: 550,625

[22] Filed: Oct. 31, 1995

[30] Foreign Application Priority Data

Oct. 31, 1994 [JP] Japan .................................. 6-290650

[51] Int. Cl.$^6$ ..................................................... H04N 7/01
[52] U.S. Cl. ........................................... 348/452; 348/458
[58] Field of Search ................................... 348/452, 448, 348/458, 699–701; H04N 7/01

[56] References Cited

U.S. PATENT DOCUMENTS

| 4,984,077 | 1/1991 | Uchida .................................... 348/458 |
| 5,181,111 | 1/1993 | Hedley et al. .......................... 348/452 |

Primary Examiner—Victor R. Kostak
Attorney, Agent, or Firm—Jacobson, Price, Holman & Stern PLLC

[57] ABSTRACT

An scanning line interpolating apparatus generates interpolation signals when scanning lines are not included in video signals are formed by interpolation, by adaptively mixing intra-picture interpolation signals formed with upper and lower scanning lines apart from scanning lines to be interpolated and inter-picture interpolation signals formed with pictures before and after the scanning lines to be interpolated. Inter-picture matching signals are obtained between the pictures and used to generate the inter-picture interpolation signals. Low frequency component difference signals are obtained between the intra-/inter-picture interpolation signals. In-and-out matching signals are obtained by obtaining an absolute value of or by squaring the difference signals. An adaptive mixture ratio is varied between the intra-/inter-picture interpolation signals with a signal obtained by adding the matching signals. An motion vector detecting apparatus generates motion vectors for interpolating scanning lines by compensating motions of pictures before and after scanning lines to be interpolated with vector values in an search area, to select motion vectors with the compensated results.

2 Claims, 6 Drawing Sheets

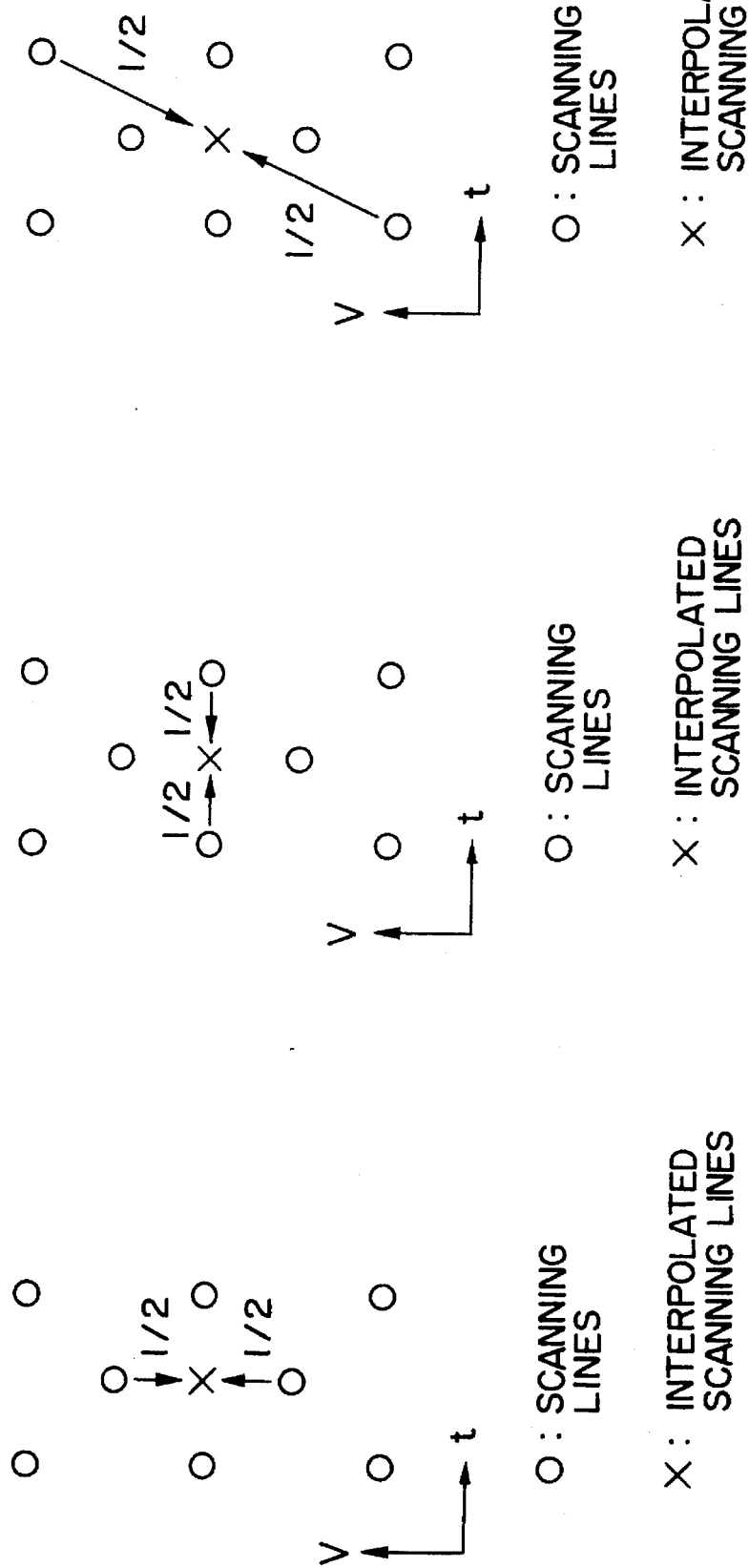

SCANNING LINE INTERPOLATING APPARATUS AND MOTION VECTOR DETECTING APPARATUS FOR SCANNING LINE INTERPOLATION

BACKGROUND OF THE INVENTION

1. Field of the Invention

The present invention relates to a scanning line interpolating apparatus for forming scanning lines having no input signals thereon by interpolation on the basis of adjacent scanning lines to convert a format of motion picture signals. Further, this invention relates to a motion vector detecting apparatus for motion compensation interpolation.

2. Description of the Prior Art

The standard television signals such as NTSC (National Television System Committee) and Hi-Vision signals are of interlaced signals; that is, as shown in FIG. 1A, one frame is composed of two fields shifted in time and the vertical direction.

In contrast with this, the scanning line structure having no time shift, as shown in FIG. 1B, is referred to as non-interlaced scanning or progressive scanning.

The interlaced signals generate flickers when the high frequency components of the video signals increase in the picture vertical direction.

To overcome this problem, there exists such a processing that scanning lines not existing between the two adjacent interlaced scanning lines are formed by interpolation on the basis of the adjacent scanning lines, as shown in FIG. 1C. The processing as described above is referred to as progressive scanning conversion or double-density conversion.

In this case, the scanning lines are interpolated in accordance with a motion-adaptable processing. In more detail, when the picture is moving, the scanning lines are formed by interpolation on the basis of the vertically adjacent scanning lines on the same field, as shown in FIG. 2A. When the picture is still, however, the scanning lines are formed by interpolation on the basis of the scanning lines located at the same positions of two before and after fields different with respect to time, as shown in FIG. 2B.

In addition, recently, a method of applying motion compensation to the inter-field interpolation has been studied. In this case, the scanning lines are formed by interpolation on the basis of the scanning lines located at different positions of two before and after fields with respect to time, as shown in FIG. 2C.

On the other hand, in the standard of the high efficiency coding methods such as H. 261 of ITU-T (International Telecommunication Union-Telecommunication Standardization Sector) or MPEG I (Moving Picture Experts Group 1) of ISO/IEC (International Organization for Standardization)/(International electrotechnical Commission), the non-interlaced video signals are to be coded. Therefore, when the interlaced video signals are used as the signal sources, it is necessary to first convert the interlaced video signals into non-interlaced video signals.

In the above-mentioned standard, since the number of pixels to be coded is smaller than that of the ordinary TV signals, there arises no problem when interlaced video signals of any one of the fields are used as the coded video signals. However, in the case of the simple reduction of the interlaced video signals, since the amount of aliasing increases, a problem arises in that the picture quality (from a subjective point of view) and the coding efficiency both deteriorate.

To eliminate the aliasing, it is necessary to form frames to be scanned by the progressing scanning and to filter the formed frames in the vertical direction through an appropriate filter to reduce the scanning lines. In this case, however, an ideal processing cannot be executed when the sequential frames are not formed appropriately.

A conventional scanning line interpolating apparatus using the motion compensation will be explained hereinbelow with reference to FIG. 3. This apparatus is disclosed in [Study of a progressive scanning conversion method for interlaced picture using motion compensation and its apparatus], Institute of Television Engineers of Japan, Technical Report, BCS 93-70.

In FIG. 3, interlaced video signals inputted through a video signal input 1 are applied to a field delay circuit 2, a motion compensator 3, and a motion vector (referred to as MV, hereinafter) detector 20, respectively.

In the field delay circuit 2, the signals are delayed by a period of time corresponding to one field, and the output signals are applied to an intraframe interpolator 9 and a field delay circuit 15.

The field delay circuit 15 delays the signals by a period of time corresponding to one field in the same way as in the field delay circuit 2, and the output signals are applied to another motion compensator 16.

Therefore, three video signals being delayed by different number of fields are applied to the motion compensator 3, the intraframe interpolator 9 and the other motion compensator 16.

On the other hand, the MV detector 20B obtains a motion vector of video signals between two fields, and the obtained values are applied to the two motion compensators 3 and 16. In accordance with the motion vector values, the motion compensators 3 and 16 shift the input video signals spatially, and output the shifted video signals.

Here, since the time relationship is opposite between the fields motion-compensated by the motion compensators 3 and 16, from the interpolated field's point of view, the shift directions are opposite to each other, as shown in FIG. 2C.

The video signals whose motion is compensated as described above are applied from the motion compensators 3 and 16 to an adder 4 and a subtracter 11.

The adder 4 adds two motion-compensated field signals with two-field difference, and multiplies the added field signals by ½ as the interframe interpolation signal. The interframe interpolation signal is applied to a multiplier 6.

The subtracter 11 obtains a difference between the two motion-compensated field signals with two-field difference, and the difference signal is applied to an absolute value converter 17 to obtain an absolute value of the difference signal. The absolute difference signal is applied to a spatial LPF (low-pass filter) 19 to smoothen the spacial variation of the absolute difference signal. The smoothened absolute difference signal is applied to a non-linear converter 14.

The non-linear converter 14 converts the output of the space LPF 19 non-linearly into a value "k" indicative of the matching rate between pictures.

The conversion characteristics are determined as 0 when the output level of the spatial LPF 19 is less than a noise level, and as 1 when the intraframe interpolation level is clearly higher than the interframe interpolation level by an appropriate value. Further, the conversion characteristics are linear between "0" and "1". The value k thus obtained is applied to the multiplier 6 and another multiplier 10.

On the other hand, the intraframe interpolator 9 adds two video signals on upper and lower scanning lines to be interpolated, as shown in FIG. 2A, to form an intraframe interpolated scanning line. Here, the delay generated by the motion compensation can be compensated, and the intraframe interpolation signal is applied to the multiplier 10 in synchronism with the interframe interpolation signal.

To the two multipliers 6 and 10, the value k indicative of the matching rate is given from the non-linear converter 14. The multiplier 6 multiplies the interframe interpolation signals by (1–k), and the multiplier 10 multiplies the intraframe interpolation signal by k. The multiplied results are applied to an adder 7.

The adder 7 adds the interframe interpolation signal (x (1–k)) and the intraframe interpolation signal (x k) both weighted by the matching rate to obtain a final interpolation signal. The final interpolation signal is outputted through an interpolation signal output 8.

To generate the sequential scanning signals on the basis of the above-mentioned interpolation signal, a sequential scanning converting apparatus as shown in FIG. 4 is used.

In the sequential scanning converting apparatus show in FIG. 4, interpolation signals outputted by a scanning line interpolating apparatus 50 are applied to a line buffer 52. The video signals are delayed by a field delay circuit 2 to compensate the processing delay caused by the scanning line interpolating apparatus 50, and then applied to a line buffer 51. The two line buffers 51 and 52 hold video signals for one line. The video signals held by the buffer 51 or 52 are read at a speed twice higher than the input signals. These read signals are selected alternately through a switch 53 as sequential scanning line signals, and then outputted through a video output 54.

A motion vector detecting apparatus (which corresponds to the MV detector 20B shown in FIG. 3) for interpolating the motion compensation scanning lines will be explained with reference to FIG. 5.

In FIG. 5, interlaced scanning video signals inputted through a video input 1 are applied to a field delay circuit 2, a motion compensator 3, and a temporal MV generator 21.

The field delay circuit 2 and another field delay circuit 15 delay video signals by one field. Therefore, the video signals delayed by one frame in total are applied to a motion compensator 16.

The temporal MV generator 21 generates motion vector values (MVs) in sequence in a predetermined MV search range. For instance, when the search range is determined as ±3 in the vertical direction in scanning line unit and ±7 in the horizontal direction in pixel unit, MV values of 105=7×15 (vertical x horizontal) are generated in sequence. The generated MV values are applied to the two motion compensators 3 and 16.

In accordance with the motion vector values, the two motion compensators 3 and 16 shift the input video signals spatially, and then output shifted video signals.

The motion compensating processing is executed in block unit (e.g., 16×8 pixels), and the MV is one value in the block.

Further, the field compensated by the motion compensator 3 and the field compensated by the motion compensator 16 are opposite to each other in time relationship from the interpolated field's point of view, so that the shift directions are opposite to each other as shown in FIG. 2C.

The video signals thus motion-compensated are applied to a subtracter 11 to obtain interframe difference signals. The difference signals are given to an absolute value converter 17.

The absolute value converter 17 obtains the absolute difference signals (e.g, by squaring the difference signals). The obtained absolute difference signals are applied to a block accumulator 24.

The block accumulator 24 accumulates the absolute difference signals for one block as a value indicative of matching rate, and the obtained value is applied to a MV selector 22. More specifically, the MV values and the matching values between two frames motion-compensated on the basis of the MV values are both inputted to the MV selector 22.

The MV selector 22 compares the MV values and the matching values to select MV values of the best matching (in which the accumulated value of the difference signals is the minimum). The selected MV values are outputted as the final MV values through an MV output 23.

Although the operation of the motion compensators 3 and 16, the subtracter 11, and the absolute value converter 17 are the same as with the case of those shown in FIG. 3, the same processing is executed for each MV, the quantity of processing increases in proportion to the number of MVs.

In other words, in order to process the motion picture in real time, since a high processing speed is required in proportion to the number of MVs, the parallel processing may be required at need.

In the conventional scanning line interpolating apparatus, the interframe interpolation and the intraframe interpolation are switched and further the motion vectors are selected for motion-compensated scanning line interpolation both on the basis of the interframe matching between the fields before and after a field to be interpolated. Therefore, as far as the interframe matching is excellent, the picture in which the interpolation signals are quite different from the upper and lower scanning lines is selected.

In particular, when the motion compensation is executed, since the video signals positioning away from each other spatially are used, there exists a problem in that inappropriate interpolation is executed.

SUMMARY OF THE INVENTION

With these problems in mind, therefore, it is the object of the present invention to provide a scanning line interpolating apparatus for appropriately switching inter-picture interpolation to intra-picture interpolation or vice versa, by use of the absolute value of the difference signal between intra-picture interpolation signals and inter-picture interpolation signals passed through a vertical LPF (low-pass filter), in addition to inter-picture matching, and a motion vector detecting apparatus for selecting the motion vectors.

In this invention, the term "picture" is defined as a frame and also as a field.

To achieve the above-mentioned object, the present invention provides a scanning line interpolating apparatus for, when scanning lines not included in input video signals are formed by interpolation, obtaining interpolation signals by adaptively mixing intra-picture interpolation signals formed on the basis of upper and lower scanning lines spatially apart from scanning lines to be interpolated and inter-picture interpolation signals formed on the basis of before and after pictures different with respect to time from the scanning lines to be interpolated, the scanning line interpolating apparatus comprising: means for obtaining inter-picture matching signals between the before and after pictures different with respect time and used to generate the inter-picture interpolation signals; means for obtaining low frequency component difference signals in a vertical direction of a picture between the intra-picture interpolation signals and the inter-picture interpolation signals; means for obtaining in-and-out matching signals with respect to the intra-picture and inter-picture interpolation signals by obtaining an absolute value of or by squaring the obtained low frequency component difference signals; and means for varying an adaptive mixture ratio between the intra-picture and the inter-picture interpolation signals on the basis of a signal obtained by adding the inter-picture matching signals and the in-and-out matching signals.

Further, the present invention provides a motion vector detecting apparatus for obtaining motion vectors used for interpolating scanning lines by compensating motions of a plurality of before and after pictures different with respect time from scanning lines to be interpolated with vector values in a predetermined search area, to select motion vectors on the basis of the compensated results, the motion vector detecting apparatus comprising: means for obtaining inter-picture interpolation signals by adding the pictures motion-compensated by the vector values; means for obtaining inter-picture matching signals among the pictures motion-compensated by the vector values; means for obtaining intra-picture interpolation signals on the basis of upper and lower scanning lines spatially apart from the scanning line to be interpolated; means for obtaining low frequency component difference signals in a vertical direction of a picture between the intra-picture and inter-picture interpolation signals; means for obtaining in-and-out matching signals with respect to the intra-picture and inter-picture interpolation signals by obtaining an absolute value of or by squaring the obtained low frequency component difference signals; and means for adding the inter-picture matching signals and the in-and-out matching signals, and deciding a vector having a minimum added result as a final motion vector.

BRIEF DESCRIPTION OF THE DRAWINGS

FIGS. 2A to 2C are illustrations for assistance in explaining the scanning line interpolation methods of various sorts;

DETAILED DESCRIPTION OF THE EMBODIMENTS

Figure 6:
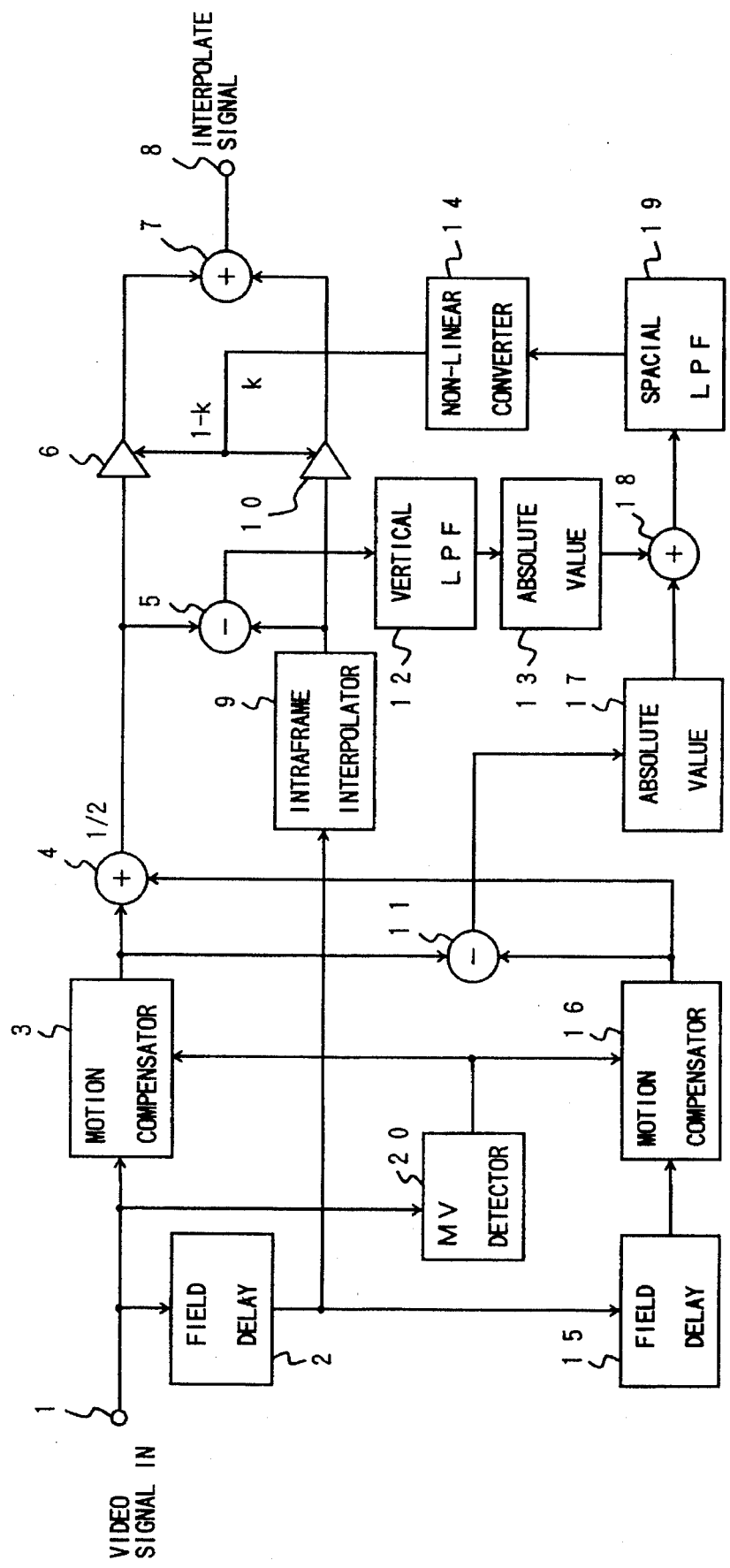
FIG. 6 is a block diagram showing a scanning line interpolating apparatus according to the present invention.

FIG. 6 is a block diagram showing a preferred embodiment of the scanning line interpolating apparatus according to the present invention. The same reference numerals have been retained in FIG. 6 for similar elements which have the same functions as with the case of the conventional apparatus shown in FIG. 3. The apparatus shown in FIG. 6 is different from the apparatus shown in FIG. 3 in that a subtracter 5, a vertical LPF (low-pass filter) 12, an absolute value converter 13, and an adder 18 are additionally provided.

The interpolating method executed by the apparatus shown in FIG. 6 is basically the same as with the case described above. However, the method of determining the criterion for adaptive processing is different from that of the prior art.

Interlaced video signals are inputted through a video input 1 and then applied to a field delay circuit 2, a motion compensator 3 and an MV detector 20.

Figure 1A:
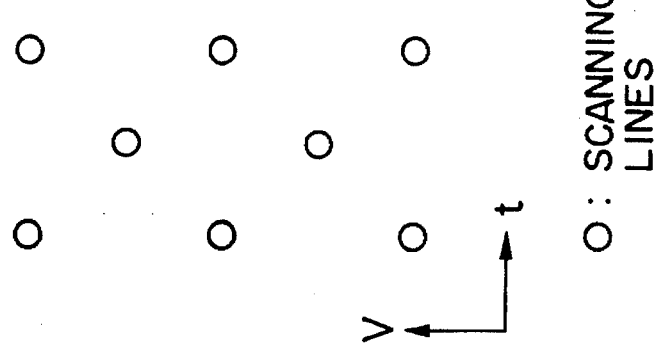
FIGS. 1A to 1C are illustrations for assistance in explaining the scanning line structures of various sorts.
Figure 1B:
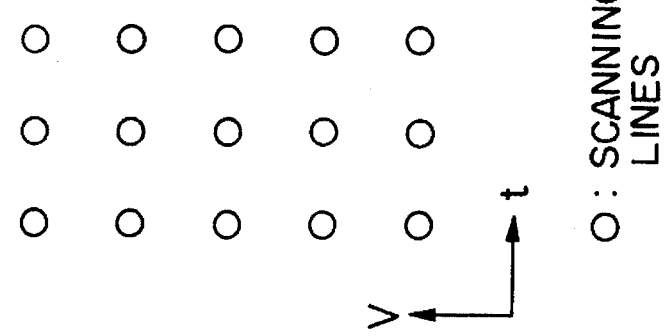
Figure 1C:
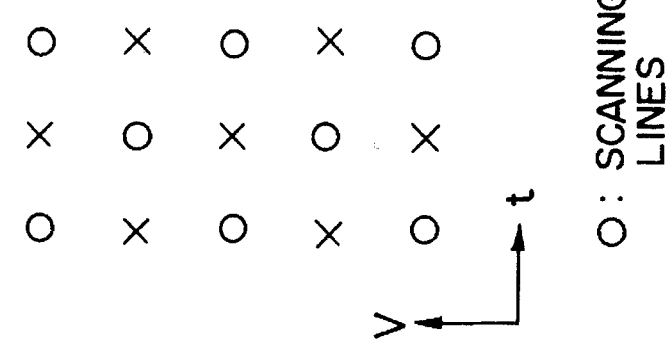
Figure 3:
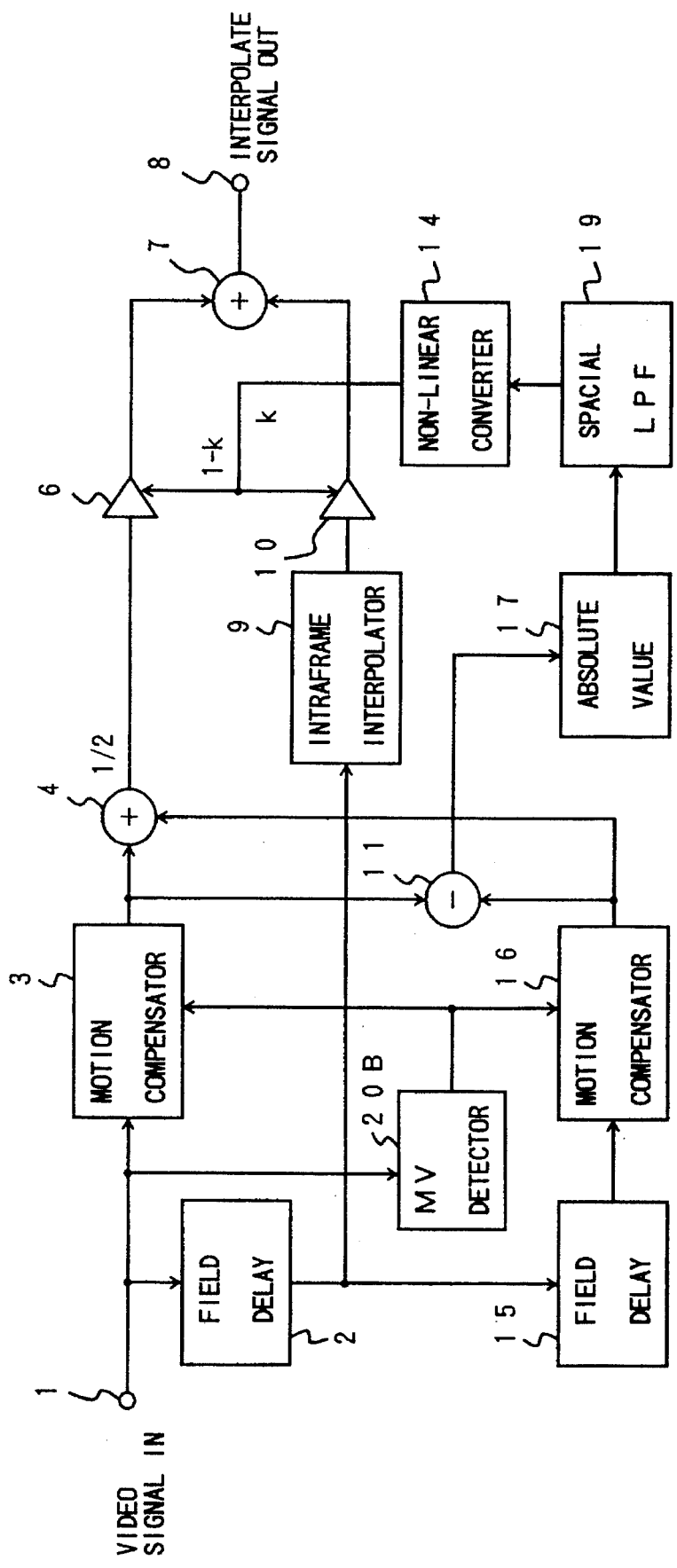
FIG. 3 is a block diagram showing a conventional scanning line interpolating apparatus.

Here, the operation of two field delay circuits 2 and 15, two motion compensators 3 and 16, and a subtracter 11 are the same as with the case of the conventional apparatus shown in FIG. 3.

The processing of an intraframe interpolator 9 is the same as that of the conventional apparatus, however, the output (the intraframe interpolation signal) is applied to the subtracter 5 in addition to a multiplier 10. The processing of an adder 4 is the same as that of the conventional apparatus, however, the output (the interframe interpolation signal) is applied to the subtracter 5 in addition to a multiplier 6. The processing of an absolute converter 17 is the same as that of the conventional apparatus, however, the output (the interframe matching signal) is applied to the adder 18.

Figure 7:
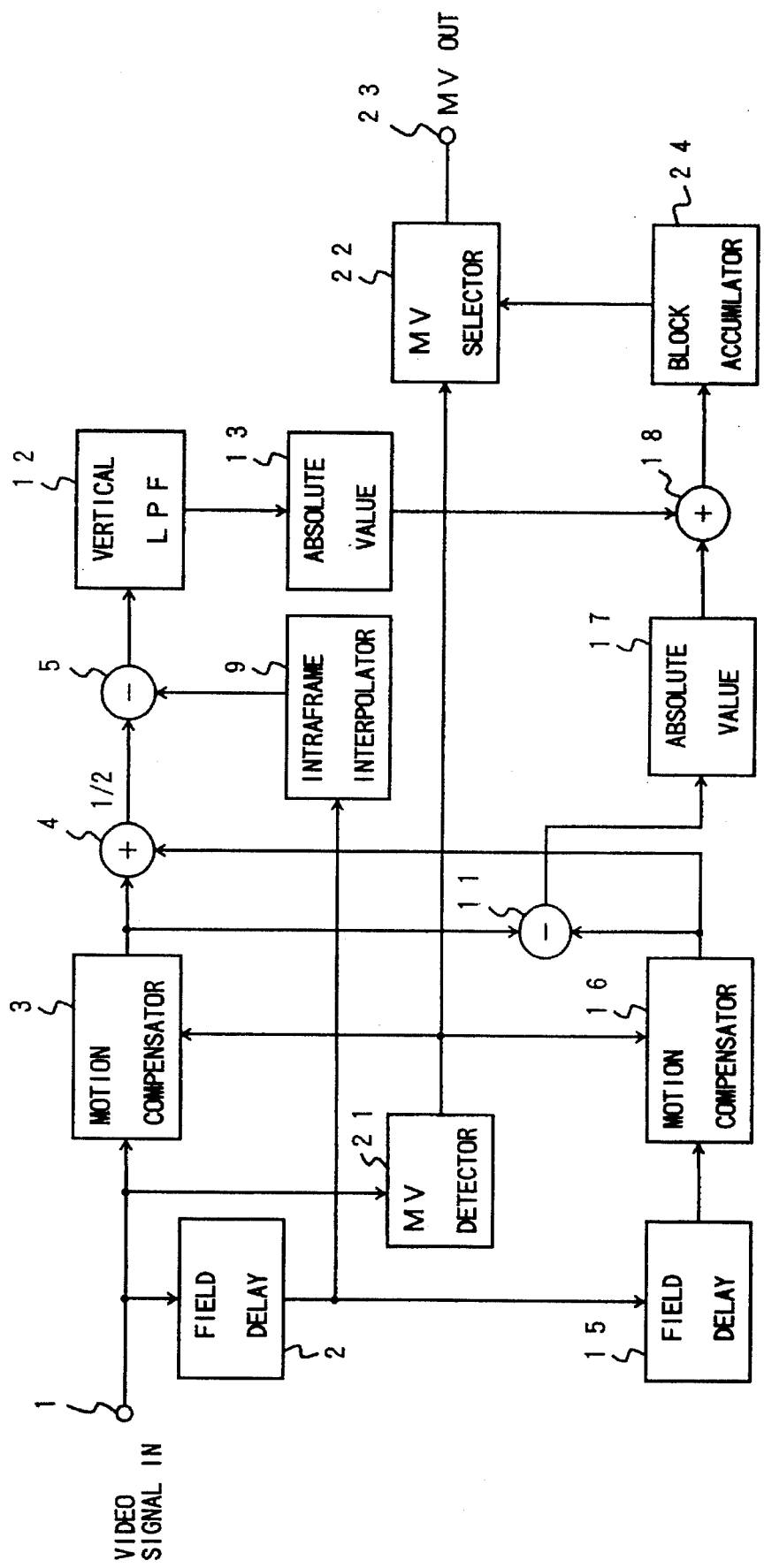
FIG. 7 is a block diagram showing a motion vector detecting apparatus according to the present invention.

The MV detector 20B shown in FIG. 3 can be used as an MV detector 20. However, it is preferable to use an MV detector as shown in FIG. 7 (described later) for improvement of the overall performance.

The subtracter 5 obtains difference signals between interframe interpolation signals and intraframe interpolation signals obtained as described with reference to FIG. 3. The difference signals are applied to the vertical LPF (low-pass filter) 12 for suppressing the high frequency components of the difference signals in the vertical direction.

As a practical example, four one-line delay circuits are provided. Further, the scanning lines two lines above and below the central scanning line are multiplied by ⅛, and the central scanning line and the scanning lines just above and below the central scanning line are multiplied by ¼. When these multiplied results are added to each other, it is possible to suppress the higher frequency band beyond about ⅓ of the overall frequency band of the video signals in the vertical direction.

In the present invention, the reason why the low frequency components in the vertical direction are used as the in-and-out matching signal (between the intraframe interpolation signals and the interframe interpolation signals) is as follows:

When the frame signals of 480 effective scanning lines are divided into two (even and odd) fields of 240 lines, the frequency components higher than 240 TV-lines cause aliasing in the frame. However, since the frequency components mixed with the frequency components lower than 100 TV-lines are those higher than the 380 TV-lines of the original frame, the possibility that these low frequency components exist in the ordinary picture is very low.

On the other hand, the frequency components lower than 100 TV-lines are different only in phase between the even fields and the odd fields, so that these frequency components are the same in both the fields basically.

On the reasons as described above, in the low frequency components in the vertical direction, the correlation between the even field and the odd field is high, so that the same can be applied to the correlation between the interframe interpolation signals and the intraframe interpolation signals under an ideal condition.

Accordingly, when the lower frequency components of the interframe interpolation signals are different from those of the intraframe interpolation signals, there exists a high probability that the interframe interpolation signals are not appropriate.

Further, since a difference in the high frequency components in the horizontal direction between both the interpolation signals occurs to some extent due to the difference in interpolating method between the two, it is also preferable to replace the vertical LPF 12 with a two dimensional (spacial) LPF which can suppress the high frequency components in both the vertical and horizontal directions.

The output of the vertical LPF 12 is converted into an absolute value (or squared), and the obtained in-and-out matching signal is applied to the adder 18.

The adder 18 adds the in-and-out matching signal (between the intraframe and interframe) to the interframe matching signal. The added matching signal is given to the spacial LPF 19.

The operation of a spacial LPF 19, a non-linear converter 14, the two multipliers 6 and 10 and an adder 7 are the same as with the case of the conventional apparatus shown in FIG. 3. The final interpolation signals are outputted through an interpolation signal output 8.

The non-linear converter 14 is basically the same as with the conventional one. However, the total conversion gain is reduced by 20 to 30% under consideration that the in-and-out matching signals are added to the interframe matching signals.

The value k indicative of the matching rate is given from the non-linear converter 14 to the two multipliers 6 and 10. The multiplier 6 multiplies the interframe interpolation signals by (1−k). On the other hand, the multiplier 10 multiplies the intraframe interpolation signals by k.

The adder 7 adds the interframe interpolation signals and the intraframe interpolation signals both weighted by the matching rate to mix both appropriately. The final interpolation signals are outputted through the interpolation signal output 8.

Figure 4:
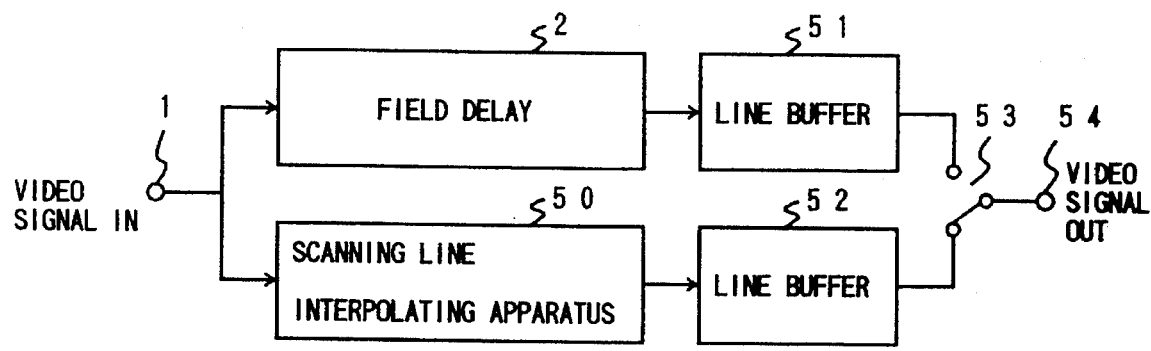
FIG. 4 is a block diagram showing a conventional sequential scanning converting apparatus.

A sequential scanning converting apparatus as shown in FIG. 4 is used to form the sequential scanning signals on the basis of the interpolation signals as described above.

A motion vector detecting apparatus for interpolating the motion-compensated scanning lines will be described with reference to FIG. 7. The motion vector detecting apparatus corresponds to the MV detector 20 shown in FIG. 6.

FIG. 7 is a block diagram showing a preferred embodiment of the motion vector detecting apparatus according to the present invention, to which the deciding method featured in the scanning line interpolating apparatus shown in FIG. 6 is applied.

Figure 5:
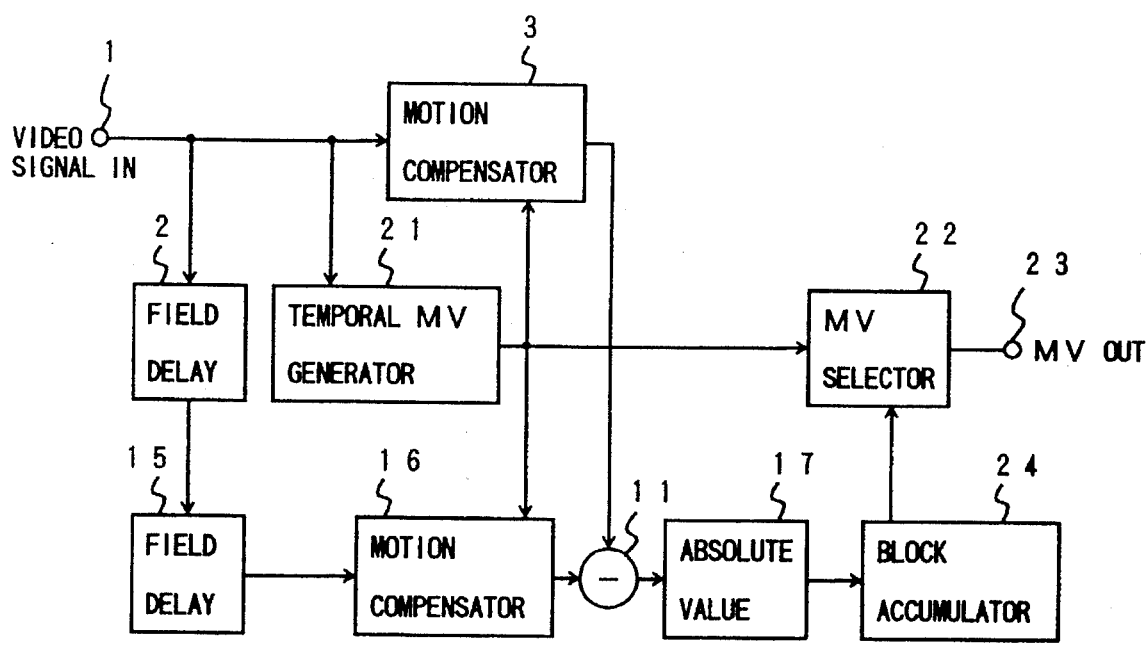
FIG. 5 is a block diagram showing a conventioanl motion vector detecting apparatus.

In FIG. 7, the same reference numerals have been retained for similar elements which have the same functions as with the case of the embodiment as shown in FIG. 6 and the conventional apparatus shown in FIG. 5. The apparatus shown in FIG. 7 is different from the apparatus shown in FIG. 4 in that an intraframe interpolator 9, a subtracter 5, a vertical LPF (low-pass filter) 12, an absolute value converter 13 and two adders 4 and 18 are additionally provided.

The MV detecting method shown in FIG. 7 is basically the same as with the case of the prior art method. However, the method of determining the criterion for the optimum MV is different from the prior art.

Interlaced video signals are inputted through a video input 1 and then applied to a motion compensator 3, a field delay circuit 2 and a temporal MV generator 21.

Here, the operation of the two field delay circuits 2 and 15, the subtracter 11 and the temporal MV generator 21 are the same as with the case of the apparatus shown in FIG. 5.

The processing of an absolute converter 17 is the same as that of the conventional apparatus, however, the output (the interframe matching signals) is applied to the adder 18.

The processing of the motion compensators 3 and 16 is the same as that of the conventional apparatus, however, the outputs are applied to the adder 4 in addition to the subtracter 11.

Being the same as that of the interpolating apparatus as shown in FIG. 6, the adder 4 adds both of the frame signals to obtain the interframe interpolation signals. The obtained signals are applied to the subtracter 5.

Being the same as that of the interpolating apparatus as shown in FIG. 6, the intraframe interpolator 9 generates the intraframe interpolation signals on the basis of the upper and lower scanning lines of the scanning line to be interpolated. The generated signals are applied to the subtracter 5.

The subtracter 5 obtains difference signals between the interframe interpolation signals and the intraframe interpolation signals. The obtained difference signals are applied to the vertical LPF 12.

The operation of the vertical LPF 12 is the same as that shown in FIG. 6. However, since the processing of the motion vector detection is executed in units of a block, the tap is enclosed within the block. This vertical LPF 12 suppresses the higher frequency band about ⅓ of the overall frequency band of the video signals in the vertical direction.

The output of the vertical LPF 12 is converted into an absolute value (or squared) by the absolute value converter 13, and the obtained in-and-out matching signal is applied to the adder 18.

The adder 18 adds the in-and-out matching signal and the interframe matching signal, and then the added matching signal is given to a block accumulator 24.

The operation of the block accumulator 24 and an MV selector 22 are the same as that of the prior art. The selected MV is outputted to an MV output 23.

The apparatuses described as the preferred embodiments process frame video signals. Not only the frame signals, these apparatuses can process field video signals. In this case, the interpolator 9 is replaced with an inter-field interpolator in FIGS. 6 and 7. Further, the adder 4, subtractor 11, and absolute value convertor 17 produce an inter-field interpolation signal, inter-field difference signal, and inter-field matching signal, respectively.

In the present invention, inter-picture (the term "picture" being defined as a frame and also as a field) interpolation signals and intra-picture interpolation signals are switched adaptively or the motion vectors are selected, both by use of the matching signals obtained by passing the absolute difference signals between the intra-picture interpolation signals and the inter-picture interpolation signals through the vertical LPF, in addition to an inter-picture matching signal. Therefore, even if the inter-picture matching is excellent, when the above-mentioned additional matching is not excellent, the interpolation signals and the motion vectors are not selected, with the result that it is possible to markedly reduce the erroneous decision in the adaptive processing and in the vector selection.

Further, since inter-picture interpolation matching processing is executed in all the frequency band, the detection sensitivity is high and the decision is accurate.

As a result, accurate interpolation scanning lines can be obtained. Further, a high quality picture can be obtained by using an appropriate format conversion such as sequential scanning conversion. Further, when applied to the preprocessing of the high efficiency codings, it is possible to increase the efficiency of the coding.

What is claimed is:

1. A scanning line interpolating apparatus for, when scanning lines not included in input video signals are formed by interpolation, obtaining interpolation signals by adaptively mixing intra-picture interpolation signals formed on the basis of upper and lower scanning lines spatially apart from scanning lines to be interpolated and inter-picture interpolation signals formed on the basis of before and after pictures different with respect to time from the scanning lines to be interpolated, the scanning line interpolating apparatus comprising:

means for obtaining inter-picture matching signals between the before and after pictures different with respect to time and used to generate the inter-picture interpolation signals;

means for obtaining low frequency component difference signals of a picture between the intra-picture interpolation signals and the inter-picture interpolation signals;

means for obtaining in-and-out matching signals with respect to the intra-picture interpolation signals and the inter-picture interpolation signals by obtaining an absolute value of or by squaring the obtained low frequency component difference signals; and means for varying an adaptive mixture ratio between the intra-picture interpolation signals and the inter-picture interpolation signals on the basis of a signal obtained by adding the inter-picture matching signals and the in-and-out matching signals.

2. A motion vector detecting apparatus for obtaining motion vectors used for interpolating scanning lines by compensating motions of a plurality of before and after pictures different with respect to time from scanning lines to be interpolated with vector values in a predetermined search area, to select motion vectors on the basis of the compensated results, the motion vector detecting apparatus comprising:

means for obtaining inter-picture interpolation signals by adding the pictures motion-compensated by the vector values;

means for obtaining intra-picture matching signals among the pictures motion-compensated by the vector values;

means for obtaining inter-picture interpolation signals on the basis of upper and lower scanning lines spatially apart from the scanning line to be interpolated;

means for obtaining low frequency component difference signals of a picture between the intra-picture interpolation signals and the inter-picture interpolation signals;

means for obtaining in-and-out matching signals with respect to the intra-picture interpolation signals and the inter-picture interpolation signals by obtaining an absolute value of or by squaring the obtained low frequency component difference signals; and means for adding the inter-picture matching signals and the in-and-out matching signals, and deciding a vector having a minimum added result as a final motion vector.

* * * * *